United States Patent
Bumpous

[15] 3,665,391
[45] May 23, 1972

[54] AUTOMATIC VEHICLE SIGNAL SYSTEM

[72] Inventor: William H. Bumpous, 100 South Bellevue Drive, Nashville, Tenn. 37205

[22] Filed: June 15, 1970

[21] Appl. No.: 57,430

Related U.S. Application Data

[62] Division of Ser. No. 677,606, Oct. 24, 1967, Pat. No. 3,538,496.

[52] U.S. Cl. .................................. 340/67, 340/70, 340/72, 340/75, 340/76, 340/80, 340/83
[51] Int. Cl. ...................................... B60q 1/38, B60q 1/44
[58] Field of Search ...................... 340/56, 66, 67, 70, 71, 72, 340/76

[56] References Cited

UNITED STATES PATENTS

| | | |
|---|---|---|
| 1,007,671 | 11/1911 | Buente et al. .................. 340/67 UX |
| 1,623,219 | 4/1927 | Tolmach .......................... 340/67 |
| 3,244,934 | 4/1966 | Webb ........................... 340/67 X |
| 3,213,417 | 10/1965 | Lewus ............................ 340/67 |
| 2,088,501 | 7/1937 | Arbuckle ..................... 340/70 UX |
| 2,960,680 | 11/1960 | Lea ............................... 340/70 |
| 3,014,200 | 12/1961 | Tewksburry ..................... 340/71 |
| 3,164,803 | 1/1965 | Leichsenring ..................... 340/72 |
| 3,441,906 | 4/1969 | Nielsen ........................... 340/72 |

Primary Examiner—John W. Caldwell
Attorney—Harrington A. Lackey

[57] ABSTRACT

An electrical circuit for a motor vehicle including a plurality of electrical signals, an inertial starting switch, a time delay mechanism and one or more inertial signal switches to energize the signals for brief periods of time to indicate different operational conditions of the vehicle, including different degrees of deceleration.

6 Claims, 5 Drawing Figures

INVENTOR:
WILLIAM H. BUMPOUS
BY Harrington A. Lackey
ATTORNEY

Patented May 23, 1972

INVENTOR:
WILLIAM H. BUMPOUS
BY
Harrington A. Lackey
ATTORNEY

INVENTOR:
WILLIAM H. BUMPOUS
BY Harrington A. Lackey
ATTORNEY 3,665,391

AUTOMATIC VEHICLE SIGNAL SYSTEM

CROSS-REFERENCE TO RELATED APPLICATION

This is a division of application Ser. No. 677,606, filed Oct. 24, 1967, now U.S. Pat. No. 3,538,496.

BACKGROUND OF THE INVENTION

This invention relates to an automatic vehicle signal system.

In conventional motor vehicle electrical signal systems, the signals include the manually operated horn and the manually operated light circuit, including the headlights and the brake lights. Moreover, the brake lights are also energized by operation of the brake pedal; optional back-up lights are operated by shifting the gears to reverse; and turn signals are energized by manually operating the turn-signal lever.

Since practically all of these signals are operated manually, the operator of the motor vehicle is confronted with a series of choices in an emergency situation requiring him to undertake certain emergency procedures to minimize or avoid an accident, in sequence, rather than simultaneously. For example, if the emergency situation can be avoided by (1) applying the brakes, (2) steering, and (3) blowing the horn, under the circumstances, the operator will do well to perform two out of three of these operations, and one of these operations would be applying the brakes. That is, the operator can apply the brakes and steer simultaneously, or apply the brakes and blow the horn simultaneously; but in an emergency, steering and blowing the horn simultaneously would be difficult, if not impossible.

Moreover, in conventional vehicle signal systems, the degree of acceleration cannot be communicated to other motorists in the vicinity, and particularly to trailing motorists. Furthermore, if the brake lights of a vehicle are defective, a trailing motorist cannot even tell whether the vehicle with the defective brake light circuit is decelerating at all.

Another disadvantage of conventional motor vehicle circuits is that the stop lights or brake lights are not as visible when illuminated in the daytime as they are at night, and may even go unobserved in the daytime because of their low illumination value relative to both direct and reflected sunlight, as well as other diversionary stimuli.

The Folberth U.S. Pat. No. 2,890,443 issued June 9, 1959 does disclose an automatic horn blowing device which will permit the operator of a motor vehicle to simultaneously brake, steer and signal under emergency conditions. However, the device includes only a single inertial switch adapted to continuously blow the horn for as long as the minimum deceleration value of the switch is exceeded by the motion of the vehicle.

SUMMARY OF THE INVENTION

It is therefore an object of this invention to provide an automatic electrical signal system for a motor vehicle in which one or more signals may be emitted simultaneously and automatically upon the attainment of a predetermined deceleration value, and which will emit the signal more efficiently and effectively.

Another object of this invention is to provide an emergency signal system in which the signals are automatically energized by the deceleration of the vehicle within certain time limits and to provide a signal system which will emit signals commensurate with the degree of deceleration.

A further object of this invention is to provide an automatic inertial signal system incorporating both horn signals and light signals.

Another object of this invention is to provide an electrical signal system for a motor vehicle in which at least one signal light will be energized briefly for different automatic and manual operations of the vehicle.

A further object of this invention is to provide an electrical system for a motor vehicle in which a light signal is briefly illuminated for each switch operation in the electrical circuit.

Another object of this invention is to provide a horn switch which may be simultaneously controlled with the steering of the vehicle.

A further object of this invention is to provide a signal system for a motor vehicle in which the rear light signals are emphasized during daytime use.

Another object of this invention is to provide an electrical light system for a motor vehicle in which the operator will be automatically apprised of the fact that his headlights are either on or off.

Another object of this invention is to provide a dual horn switch system in which the horn may be energized to emit high or low level sound energy.

A further object of this invention is to provide a brake light system for a motor vehicle in which lights are mounted on the front and sides of the vehicle as well as the rear.

Another object of this invention is to provide a motor vehicle electrical signal system which will promptly communicate to other motorists more vehicle operations and situations than has been previously possible with conventional vehicle signal systems, and which will consequently improve the flow of traffic and safety conditions and will also effect economy in fuel consumption and minimize air pollution.

DESCRIPTION OF THE PREFERRED EMBODIMENT

Figure 1:
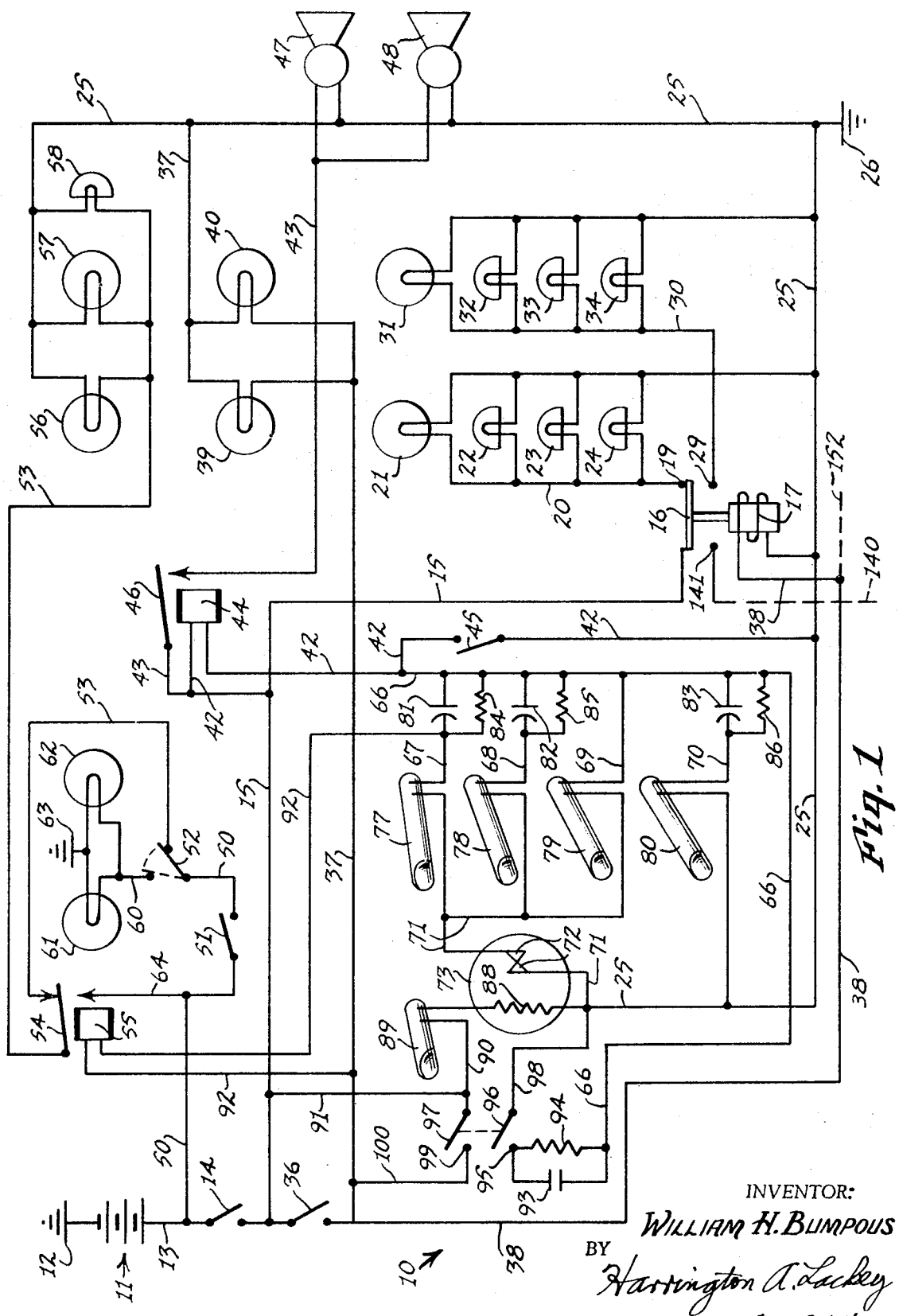
FIG. 1 is a schematic diagram of an electrical circuit incorporating the invention.

Referring now to the drawings in more detail, and particularly FIG. 1, the electrical circuit 10 made in accordance with this invention for incorporation in a motor vehicle, includes a battery 11, grounded at 12, and connected through lead 13 to ignition switch 14. The other side of ignition switch 14 is connected to one end of body light line 15, while the other end of line 15 is permanently connected to body light relay switch 16 controlled by relay coil 17.

The relay switch 16 is adapted to operate between two selective positions. In its upper, de-energized position, as shown in FIG. 1, the relay switch 16 engages contact 19 in order to energize the green body light circuit 20, when the ignition switch 14 is closed. The body-light circuit 20 includes in parallel, front green light 21, left-side green light 22, right-side green light 23 and rear green light 24. The other side of the green body-light circuit 20 is connected to the common ground line 25 grounded at 26.

When the relay switch 16 is in its lower energized position, it engages contact 29 to energize the red body-light circuit 30, when the ignition switch 14 is closed. The red bodylight circuit 30 includes, in parallel, the front red light 31, the left-side red light 32, the right-side red light 33 and red pilot light 34. The other side of the red body-light circuit 30 is also connected to the common ground line 25.

Connected in series with ignition switch 14, but in parallel with the body-light line 15, is a conventional brake switch 36, which is operatively connected to the brake pedal of the motor vehicle so that it is closed when the pedal is depressed and is opened when the pedal is released. When the brake switch 36 is closed, it supplies energy to the conventional brake-light circuit 37 and the body-light relay coil circuit 38, both circuits 37 and 38 being in parallel. The brake-light circuit 37 includes brake lights 39 and 40 in parallel, and is connected to the common ground line 25. The relay-coil circuit 38 includes the body-light relay coil 17 which is also grounded through the common line 25.

Branching off from the body-light 15 are the horn-relay circuit 42 and the parallel horn circuit 43. Included in the horn-relay circuit 42 is the horn relay coil 44 and manual primary horn switch 45 in series. The horn-relay circuit 42 is also grounded through the common line 25. The horn circuit 43 includes relay switch 46 and a pair of electrically energized horns 47 and 48 in parallel, the other sides of which are also connected to the common ground line 25.

Connected to the battery supply line 13 is the light-supply line 50, light switch 51 and dimmer switch 52 in series. FIG. 1 discloses the dimmer switch 52 in its solid-line, high-beam position closing high-beam circuit 53. High-beam circuit 53 includes relay switch 54 controlled by relay coil 55. When the relay switch 54 is in its normal upper position disclosed in FIG. 1, it closes the high-beam circuit 53 which includes in parallel high-beam headlamps 56 and 57 and pilot light 58, the other sides of which are connected to the common ground line 25.

When the dimmer switch 52 is moved to its dashed-line, low-beam position in FIG. 1, then the high-beam circuit 53 is open, and the low-beam circuit 60, including in parallel low-beam lamps 61 and 62 grounded at 63, is energized to illuminate the low-beam lamps 61 and 62.

When the light relay coil 55 is energized, the relay switch 54 is moved to its lower position connecting the light branch circuit 64 so that energy from the battery 11 is directly applied to the high-beam headlamps 56 and 57 and high-beam pilot light 58 through lines 13, 50, 64 and 53, thus by-passing the manual light switch 51 and dimmer switch 52, as well as the low-beam light circuit 60.

Branching off from the horn-relay-coil circuit 42 and in parallel with the primary horn switch 45 is the secondary horn switch circuit 66. Connected to the secondary horn-switch line 66 in parallel with each other are a first signal-switch circuit 67, a second signal-switch circuit 68, a third signal-switch circuit 69 and a fourth or ancillary signal-switch circuit 70. The first, second and third signal-switch circuits 67, 68 and 69 are connected to a common return line 71 which includes the switch contacts 72 in a time-delay relay switch 73. The return line 71 is then connected to the common ground line 25, as is the ancillary signal-switch circuit 70.

The signal-switch circuits 67, 68, 69 and 70 include inertial switches 77, 78, 79 and 80, respectively. Each inertial switch is in the form of an elongated closed tube inclined in the direction of travel of the vehicle, with its front end uppermost. Each tube includes a mercury globule normally at its lower end and open-switch contacts in the upper end. Thus, when the mercury globule in each tube 77 – 80 is caused to move up the inclined wall of the tube toward the switch contacts, when the vehicle is decelerating, then each corresponding switch circuit 67 – 70 will be closed, depending upon the degree of deceleration of the vehicle and the inclination of each respective tube. It will be noted in the drawings that each successive inertial switch 78 – 80 is progressively inclined at a greater angle to the horizontal than inertial switch 77 so that each successive circuit 68 – 70 will be closed at successively higher values of deceleration of the vehicle.

Also included in the first signal-switch circuit 67 is a condenser 81 between the inertial switch 77 and the secondary horn switch line 66. A similar condenser 82 is connected in the second signal switch circuit 68 between the inertial switch 78 and the line 66. Moreover, a third condenser 83 is connected in the emergency-switch line 70 between the inertial switch 80 and the line 66. It will be noted that no condenser is located in the third signal-switch circuit 69. In shunt circuit or in parallel with each of the condensers 81, 82 and 83, is a resistor 84, 85 and 86, respectively, to permit gradual discharge of each corresponding condenser.

The time delay relay switch 73 is of a conventional type such as the Amperite model 12C2, and includes a resistor heater element 88 connected on one side to the common ground line 25 and on its other side to an inertial starting switch 89. The starting switch 89 is also an inclined, closed-end tube including a mercury globule at the lower end with open contacts at its upper end, similar to the signal switches 77 – 80. The other side of the starting switch 89 is connected through line 90 to branch line 91 which is connected to the body-light line 15 between the horn-relay circuit 42 and the ignition switch 14.

The light relay coil 55 is energized through circuit 92, one end of which is connected to brake-light circuit 37, and the other end of which is connected to first signal-switch circuit 67 between the first inertial switch 77 and condenser 81.

The secondary horn-switch line 66 is also connected through a condenser 93 and shunt resistor 94 to a switch contact 95 forming part of a double-pole, single-throw, low-level secondary horn switch 96 – 97. The switch arm 96 is connected through line 98 to the common ground line 25. The other switch arm 97 is connected to the branch line 91 and adapted to make and break with contact 99 to close and open circuit 100 connected to brake-light circuit 37.

Figure 2:
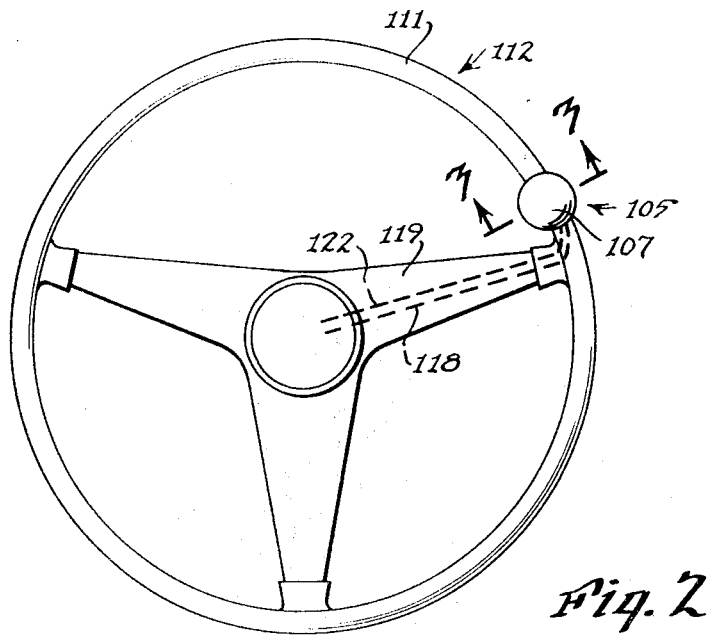
FIG. 2 is a plan view of a motor vehicle steering wheel incorporating the horn button made in accordance with this invention.
Figure 3:
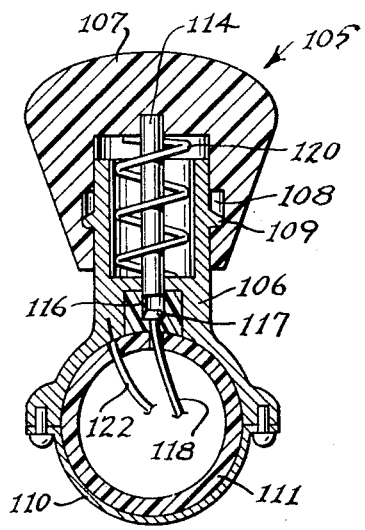
FIG. 3 is a section taken along the line 3—3 of FIG. 2.

The primary horn switch 45 is preferably incorporated in the steering knob 105 disclosed in FIGS. 2 and 3. The steering knob 105 includes a fixed base 106 supporting a cap 107 which is mounted upon the base 106 for free rotatable movement and axial reciprocable movement about an axis parallel to the axis of the steering column. The cap 107 may be connected to the base 106 by the circumferential slot 108 and ring 109 to constrain the cap 107 to the above movements. The base 106 may be fixed to a clamp 110, by any convenient means, which is secured about the rim 111 of a conventional steering wheel 112. The horn switch 45 may comprise a depending conductor rod 114 fixed to the cap 107 and adapted to axially reciprocate within a recess 116 in the base 106. When the cap 107 is fully depressed, the rod 114 engages a live contact 117 fixed in the bottom of the recess 116 and connected through lead 118, which passes through the rim 111 and spoke 119, to the regular horn connection of the steering wheel 112. The rod 114 in turn is grounded through base 106 to ground wire 122. A spring 120 is mounted within the base 106 to maintain the cap 107 in a raised, inoperative position.

It will thus be seen that the operator of the vehicle can simultaneously steer the vehicle and sound a warning signal through the horns 47 and 48 by grasping the steering knob 105, and specifically the rotatable and reciprocable spinner cap 107. Thus, without interrupting the steering of the vehicle, the same cap 107 may be depressed at any desired time to close the horn switch 45 and energize the horns 47 and 48. Consequently, in an emergency situation, the operator can simultaneously steer and signal, as well as apply the vehicle brakes through the brake pedal.

Figure 4:
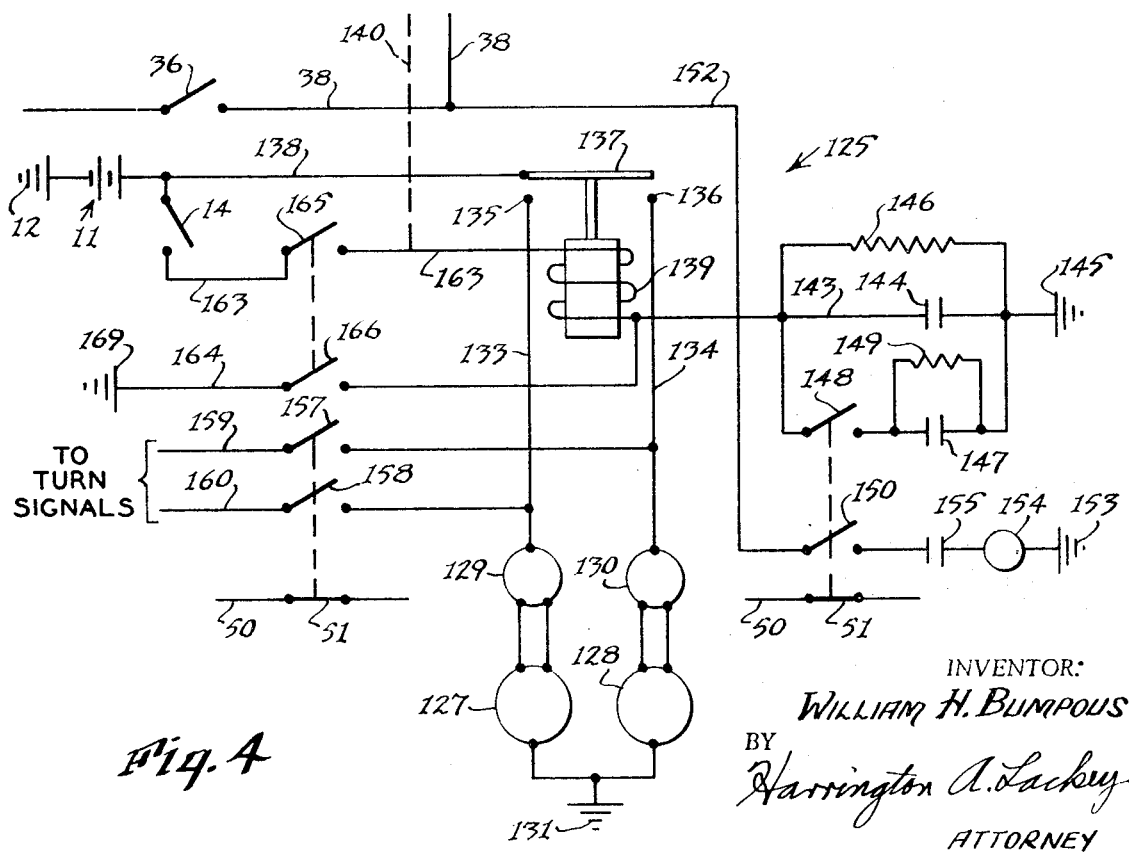
FIG. 4 is a schematic diagram of an electrical circuit connected to the circuit disclosed in FIG. 1 for energizing the supplementary rear lamps.

A supplementary rear lamp circuit 125, disclosed in FIG. 4, may be connected to the main circuit 10, disclosed in FIG. 1, in order to provide additional illumination in the vehicle light system particularly in the daytime, and particularly at the rear of the vehicle. The supplementary circuit 125 includes rear lamps 127 and 128, each having a high-beam emitter and a low-beam emitter, such as Tung-Sol No. 4002, 12 volts. Each lamp 127 and 128 is connected to a flasher 129 and 130, respectively, such as Tung-Sol No. 537, 12 volts, so that when each flasher 129 or 130 is energized, the corresponding rear lamp 127 or 128 will alternately emit a high-beam signal and a low-beam signal continuously as long as the corresponding circuit 133 or 134 is closed. The lamps 127 and 128 are grounded at 131 and connected in parallel circuits 133 and 134 terminating at the opposite ends in contacts 135 and 136. Electrical current is supplied to both circuits 133 and 134 simultaneously by means of the relay switch 137 connected through supply circuit 138 to the battery 11. The relay switch 137 is energized by coil 139.

The coil 139 is supplied with current from the interconnecting line 140 shown in dashed-lines in both FIGS. 1 and 4, the end of which forms contact 141 which is adapted to be engaged by the relay switch 16 when it is depressed to engage contact 29. The relay switch 16 is depressed when the coil 17 is energized by depressing the brake pedal and closing the brake switch 36. The other side of the coil 139 is connected to line 143 including condenser 144 which is grounded at 145. Shunt resistor 146 is connected in parallel with condenser 144. Also connected in parallel with condenser 144 is another condenser 147 in series with one arm 148 of a double-pole, single-throw switch. The condenser 147 is also connected in parallel with shunt resistor 149.

The other arm 150 of the double-pole, single-throw switch, incorporating switch arm 148, is in a circuit 152 including in series ground 153, warning light 154, and condenser 155. The circuit 152 is supplied with power from body-light relay-coil circuit 38 and brake switch 36, disclose in FIG. 1.

The double-pole switch 148 - 150 is connected with the light switch 51 so that when the light switch 51 is closed, as disclosed in FIG. 4, the switch arms 148 and 150 are open. Conversely, when the light switch 51 is open, the switch arms 148 and 150 are closed.

The light switch 51 is also interconnected with another double-pole, single-throw switch incorporating arms 157 and 158 adapted to open and close lines 159 and 160 connected to the conventional automobile turn-signal circuit. The other ends of the lines 159 and 160 are connected to the rear-lamp circuits 134 and 133, respectively. Thus, when light switch 51 is closed, as disclosed in FIG. 4, the switch arms 157 and 158 are open. Conversely, when the light switch 51 is open, the switch arms 157 and 158 are closed.

Also adapted to energize the lamp-circuit relay coil 139 independently of the interconnecting line 140 are lines 163 and 164 each of which is adapted to be opened and closed by the switch arms 165 and 166, respectively, of a double-pole, single-throw switch. The switch arms 165 and 166 are closed by shifting the conventional gear lever in the motor vehicle to reverse position. The return line 164 is connected to ground 169 while the supply line 163 is connected to ignition switch 14.

The various operations of the invention, some of which are already apparent, will now be described, assuming that all of the switches are initially open as disclosed in FIG. 1.

The high-beam headlights 56 and 57 and the low-beam headlights 61 and 62 are controlled in a conventional manner through the light switch 51 and dimmer switch 52.

When the ignition switch 14 is closed, with the brake switch 36 open, the green body-light circuit 20 is energized, so that green lights 21 - 24 are all illuminated on the front, sides and rear of the vehicle in order to communicate to others in the vicinity, such as motorists or pedestrians, that the signalling vehicle is either in a state of motion, or is about to be in a state of motion, and that the vehicle is not decelerating or temporarily stopped.

When the brake pedal is applied by the operator of the vehicle, the brake switch 36 is closed to energize several circuits simultaneously. Circuit 37 is energized to illuminate brake lights 39 and 40. The relay coil circuit 38 is energized to close the relay switch 16 against contacts 141 and 29, thus de-energizing the green body-light circuit 20 and energizing the red body-light circuit 30. Consequently, not only will the rear brake lights 39 and 40 be illuminated, but also the front red light 31, side lights 32 and 33, and the pilot light 34 on the dashboard. Thus, as the green lights go out and all the red lights are illuminated, motorists viewing the signalling vehicle from any position will immediately be alerted that the vehicle is in the process of decelerating or stopping.

Whenever the operator desires to manually sound the horn at the high energy level, he merely depresses the spinner cap 107 on the steering knob 105, which closes primary horn switch 45 without interrupting the steering of the vehicle. The horn relay 44 is then energized to close the relay switch 46 and energize the horns 47 and 48.

If it is desired to issue a low energy sound from the horns 47 and 48 where such a sound is sufficient for the specific situation, such as in crowded or congested traffic, then the operator closes the secondary horn switch 96, which will energize horn relay 44 for a brief moment, that is, within sufficient time for the condenser 93 to become charged so that the horns 47 and 48 will emit tones of short duration.

In emergency situations where the brake pedal is applied causing the vehicle to decelerate, the inertial switches 77 - 80 are designed to automatically actuate the horns 47 and 48, depending upon the degree of deceleration and consequently the degree of the emergency. In order to better illustrate the operation of these inertial switches, it will be assumed that the inertial starting switch 89 is disposed at a slight angle which will cause it to close at a deceleration value of approximately 0.05G (where G= acceleration of gravity), or at that value which just exceeds the deceleration of the vehicle resulting from all internal friction and inertia, and wind resistance, except brake friction, when the gas pedal is released at cruising speeds.

Further, by way of example, the first inertial signal switch 77 may be set to close at about 0.14G; the second inertial signal switch 78 may be set to close at about 0.34G; the third inertial signal switch 79 may be set to close at about 0.50G; and the ancillary inertial signal switch 80 may be set to close at about 0.55G.

The time delay relay switch 73 may include a heater element 88 having a fixed resistor value, or a variable resistance which may be set at the desired resistor value for opening the contacts 72 at the desired time. By way of example, it will be assumed that after the inertial starter switch 89 is closed, the normally closed contacts 72 will automatically open in about two seconds. The purpose of the time-delay switch 73 is to avoid actuating the automatic signals during normal or gradual decelerating of the vehicle. For example, the time of two seconds for the time-delay relay 73 and the setting of the first inertial switch 77 at a value of 0.14G have been selected under the assumption that under normal deceleration conditions of a vehicle resulting from normal braking for a gradual stop, it will take longer than 2 seconds for the deceleration value of the vehicle to increase from 0.05G to 0.14G. Consequently, although the deceleration value may be increasing, nevertheless at the end of two seconds after the brakes are applied, or after the inertial switch 89 is closed, the contacts 72 will open before the first inertial switch 77 closes. It will be seen in FIG. 1 that even though the inertial switch 77 is closed and the contacts 72 are open, there is no current to the horn relay 44.

In the same manner, none of the switches 77, 78, 79 will actuate the horn signals 47 and 48, even though any one or all of them are closed, if such actuation occurs after the 2-second period which automatically opens the contacts 72 in the time-delay relay 73.

On the other hand, the ancillary signal circuit 70, including the ancillary inertial signal switch 80, by-passes the time-delay relay 73, so that the ancillary circuit 70 may be closed at any time and during any time period, even during the 2-second period after the inertial starting switch 89 is closed, provided the vehicle deceleration has attained the value of 0.55G.

The condensers 81 and 82 in the first and second signal switch circuits 67 and 68, respectively, are included to provide a single sound or "toot" of brief duration when the corresponding deceleration values of inertial switches 77 and 78 are attained. On the other hand, no condenser is inclined in the third signal-switch circuit 69, and consequently when the deceleration value of 0.50G has been attained during the two-second interval permitted by the time delay switch 73, the sound emitted from the horns 47 and 48 will be continuous until the contacts 72 open.

Figure 5:
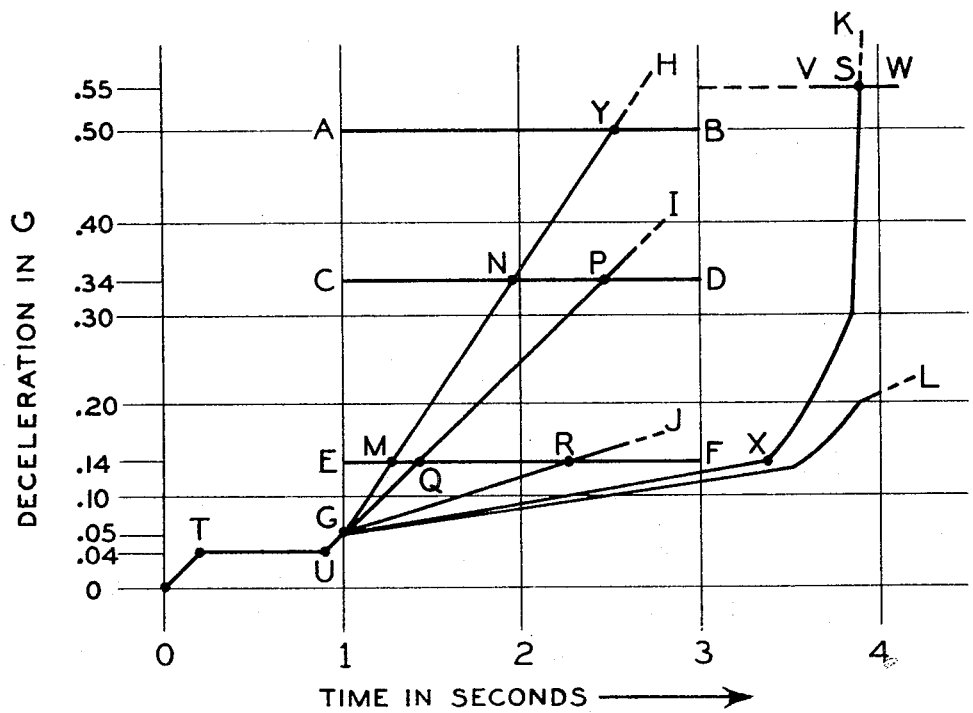
FIG. 5 is a graph illustrating the effects of various degrees of deceleration of the motor vehicle upon the electrical signal system.

The operation of the inertial switches 77 - 80 are graphically illustrated in FIG. 5. The sloping line O–T illustrates the increase in deceleration from 0 to 0.04G when the foot is removed from the accelerator to permit the vehicle to decelerate by engine-braking. The line U–G illustrates the increase in deceleration from the engine-braking condition to 0.05G by initially applying the brakes to close the starting switch 89. At point G which is 0.05G deceleration at one second, the heater element 88 is energized. At the end of the 2-second period, that is, the 3-second line on the graph of FIG. 5, the contacts 72 will open. The horizontal line EF represents the threshold value 0.14G of the first signal switch 77; the horizontal line CD represents the threshold value of 0.34G of the second signal switch 78; and the horizontal line AB illustrates the threshold value 0.50G of the third signal switch 79. The line VW and its horizontal projection represent the threshold value of 0.55G for the ancillary signal switch 80. The threshold value line VW is disclosed in a time interval beyond the 2-second time period of the delay switch 73 to further illustrate that the ancillary signal switch 80 by-passes the time-delay switch 73.

The sloping line GL in FIG. 5 illustrates a normal or gradual deceleration of the vehicle in which even the initial threshold of 0.14G of the first signal switch 77 is never attained during the 2-second interval of the delay switch 73. However, even if the deceleration value exceeds 0.14G after the 2-second interval, for example, between the 3-and-4-second marks in FIG. 5, nevertheless no signals will be energized by any of the signal switches 77 - 80, unless the value attains 0.55G. The line GX illustrates the same type of deceleration as the line GL. However, the extension XK, which illustrates a very abrupt braking after the 2-second interval of the time delay switch 73 has elapsed, crosses the emergency threshold line VW at S, in which event the ancillary switch 80 closes and energizes the horn relay 44 to emit a horn signal of brief duration. The length or brevity of the horn signal will depend upon the value of the condenser 83 and the amount of time it takes for the condenser 83 to become charged.

The line GJ has a greater slope than the line GX and crosses the threshold line EF at R, to illustrate a vehicular deceleration in which the threshold value 0.14G is attained in a little over 1 second from the time the starting switch 89 is closed, resulting in the closing of the first signal switch 77 to emit a brief, single horn signal governed by the condenser 81. The line GJ also illustrates that the deceleration is not great enough to attain the threshold value of 0.34G of the second signal switch within the 2-second interval. Consequently, only one signal will be issued.

The line GI illustrates a greater vehicular deceleration in which both threshold values 0.14G and 0.34G of the first and second signal switches 77 and 78 are respectively attained in little less than half a second Q and approximately one and a half seconds P, so that both switches 77 and 78 will be sequentially closed to issue successive horn signals of brief duration.

The line GH illustrates a sharp deceleration in which all three switches 77, 78 and 79 will be closed successively when their respective threshold values are attained at M, N and Y on the graph. In this situation, the first "toot" or horn signal will issue in a fraction of a second, while the second "toot" or single signal will issue in slightly less than one second, and the third signal caused by the closing of the third signal switch 79 will be a continuous sound for a little over a half second, or in other words, the time represented by the horizontal line YB. The third signal will be terminated at the 3-second mark when the contacts 72 are opened.

Another important feature of this invention is the issuance of brief light signals through the high-beam headlights 56 and 57 and pilot light 58 whenever a switch in the system 10 is opened or closed, that is, the ignition switch 14, the brake switch 36, the primary horn switch 45, the secondary horn switch 96 and the first signal switch 77. The brief light signals or flashes are caused by the charging and discharging of the condenser 81 and its connection through the light relay circuit 92 with the light relay coil 55. Thus, for example, when the ignition switch 14 is closed, current from the battery is transferred through the body-light line 15, horn-relay circuit 42, secondary horn circuit 66, condenser 81, relay-coil circuit 92, and thence to ground through both the brake-light circuit 37 and, to an insignificant extent, through the body-light relay-coil circuit 38. During this brief period while the condenser 81 is being charged, the relay coil 55 is closed to move the relay switch 54 down so that the high-beam headlight circuit 53 is connected to the branch circuit 64 and light supply circuit 50. As soon as the condenser 81 is fully charged, the relay coil 55 is de-energized and the relay switch 54 returns to its normal upward position.

Although high-beam headlights 56 and 57 are momentarily illuminated when ignition switch 14 is closed, brake lights 39 and 40 will not illuminate because of the relatively high total resistances in series of relay coils 44 and 55 and condenser 81. Moreover, sufficient current does not flow through circuit 38 to energize relay coil 17. Consequently, there is no alternation of illumination between body lights 21 - 24 and 31 - 34. In this connection it should be noted that the light relay coil 55 is made more sensitive than the horn-relay coil 44. Otherwise, everytime a switch, such as the ignition switch 14, is opened or closed, then the undesired brief horn signals would be attained as well as the high-beam headlight signals.

When the first signal switch 77 is energized, not only will the initial horn signal be issued, but the headlights 56 and 57 will also flash because the brake switch 36 will be closed, supplying current through light-relay circuit 92, switch 77, and switch 72.

Since the capacitor 81 is charged when the ignition switch 14 is closed, when the secondary horn switch 96 is closed, the other arm 97 of the double-pole switch engages contact 99 permitting the condenser 81 to discharge through the light relay coil circuit 92, a portion of the line 37, line 100, switch arm 97, branch circuit 91, body-light line 15 and horn-relay-coil circuit 42 back to the other side of the condenser 81. Reopening the secondary horn switch 96 and 97 will cause the condenser 81 to again recharge. Consequently, on each closing and opening of the secondary horn switch 96 - 97, the high-beam headlights 56, 57 and the pilot light 58 will flash.

Moreover, since the switch arm 97 in the secondary horn switch is in parallel with the brake switch 36, the closing of the switch arm 97 will perform the same electrical functions as the closing of the brake switch 36, specifically energizing the brake lights 39 and 40 and also energizing the body-light relay coil 17.

Opening and closing the primary horn switch 45 will also cause the high-beam headlights 56 and 57 to flash. When the primary horn switch 45 is open, the condenser 81 is charged by the closed ignition switch 14, as previously described. When the horn switch 45 is closed, the condenser 81 is discharged to ground through lines 66 and 42, switch 45 and the common ground line 25.

In the event that the vehicle incorporating the circuit 10 is driven at night with the high-beam headlights 56 and 57 already on, that is, with the light switch 51 closed and the dimmer switch 52 closing the circuit 53, as illustrated in FIG. 1, any energization of the relay coil 55 caused by the opening or closing of the switches previously described, would cause flickers in the high-beam headlights when the circuit 53 is interrupted by the opening of the relay switch 54.

On the other hand, if the vehicle is being driven at night with the dimmer switch 52 in its dashed-line position to close the low-beam headlight circuit 60, then the low-beam circuit 60 would not be interrupted at all, but would be supplemented by flashes of high-beam headlights 56 and 57 when the relay switch 54 is actuated to engage the branch circuit 64 and the light supply line 50, momentarily closing the circuit to the high-beam headlights 56 and 57.

Although each of the condensers 81, 82, 83 and 93 is provided with a corresponding shunt resistor 84, 85, 86 and 94, only the resistors 85, 86 and 94 are necessary to permit gradual discharge of their respective condensers so that they will be in condition for re-charging when subsequently energized, in order to permit successive horn "toots". The condenser 81 has a preferential discharge path through circuit 92 to other circuits in the system whose switches are closed. When such other circuits fail, resistor 84 would be functional in an emergency.

Now referring particularly to FIG. 4, the circuit 125 primarily affords additional illumination for the rear brake lights 39 and 40 for daytime driving in order to provide the necessary contrast between the rear signals and the direct and reflected rays of sunlight. However, briefer, supplemental rear signals are also emitted for night time driving.

In order to arm the rear lamps 127 and 128 for daytime energization, the double-pole single-throw switch 148 and 150 is closed when the light switch 51 is open. Thus, when the brake pedal is depressed, the brake switch 36 will close the circuit 152 through the closed switch arm 150, charging the condenser 155 and simultaneously illuminating the warning light 154 on the dashboard. Also, when the brake switch 36 is closed, as shown in FIG. 1, the relay switch 16 is depressed to engage the contact 141, thereby supplying current through the line 140 to the line 163, coil 139, and line 143, to charge the condenser 144 and simultaneously close the relay switch 137 across both circuits 133 and 134, thereby energizing the corresponding flashers 129 and 130 and rear lamps 127 and 128. Being very powerful sources of illumination and also being turned off after a brief period of time determined by the value of the capacitor 144, the rear lamps 127 and 128 provide a very strong and supplemental stimulus to a trailing motorist in the daytime, which could not be effected by the conventional brake lights 39 and 40.

Since the other arm 148 of the double-pole, single-throw switch 148 and 150 is also closed in the daytime, then the condenser 144 is supplemented by the condenser 147 in order to prolong the illumination of the lights 127 and 128 for several seconds.

The warning light 154 will flash for each depression and for each release of the brake pedal because of the inclusion of the condenser 155 in circuit 152, when the switch 150 is closed. Switch 150 is normally closed in the daytime when the main light switch 51 is open. However, should light switch 51 remain open at dusk or after dark, the illuminated or flashing warning light 154, for each opening and closing of brake switch 36 will apprise the operator that his headlights are not on. After the situation is remedied by closing light switch 51, the warning light 154 is de-energized by the simultaneous opening of switch 150. The luminous output of warning light 154 is low enough that its flashing will hardly be noticeable during the daylight hours, but will be inescapably conspicuous in the dark.

The warning light 154 also serves as a trouble light to indicate the operativeness of the circuit 152 when brake switch 36 and switch arm 150 are closed, and also to indicate the condition of the brake lights 39 and 40 when the brake switch 36 is opened.

During nighttime driving, the light switch 51 will normally be closed so that switches 148, 150, 157 and 158 are simultaneously and automatically opened, as disclosed in FIG. 4.

Although the closing of brake switch 36 will not close circuit 152, since switch arm 150 is open, it will close circuit 140, by actuating relay switch 16, to energize relay coil 139 and charge condenser 144, but not condenser 147, since switch 148 is open. Because only one condenser 144 is charged, the energization period of coil 139 and flashers 129 and 130 is briefer at nighttime than in the daytime, and consequently the rear lamp signal is of shorter duration. As a matter of fact, the values of condenser 144 and resistor 146 are preferably selected so that the rear lamps will discharge only a single high-beam signal, without time for any alternating flashes, since the signal demands at night are much less than in the daytime.

The rear lamps 127 and 128 are connected to the turnsignal circuit by leads 159 and 160 so that the lamps are energized only in the daytime by the closed switches 157 and 158 connected with the open light switch 51. Thus, when the conventional vehicle turn signal lever is turned for either a right-hand turn or a left-hand turn, then the rear lamp 127 or 128 will also flash for the duration of the turning movement.

By engaging the reverse gear in the vehicle which is operatively connected to the double-pole, single-throw switch 165 - 166, lines 163 and 164 are closed to energize coil 139 and close relay switch 137 so that power from the battery 11 is continuously supplied to the rear lamps 127 and 128 through flashers 129 and 130, as long as the vehicle is in reverse gear. In this manner, the lamps 127 and 128 provide very effective backup lights, particularly in view of their two-beam scanning action.

It will thus be seen that a vehicular electrical circuit system has been provided in which practically every movement or intended movement of the vehicle and its operator can be communicated to and anticipated by any other motorist within sight or sound of the vehicle equipped with circuits 10 and 125. From the very moment that the operator enters the vehicle and turns on the ignition switch 14, motorists will see the stationary vehicle immediately light up with green lights 21 – 24, and note the flashing headlights 56 and 57 so that they are apprised that the circuit equipped vehicle will soon be in motion and will enter the stream of traffic.

The selective energization of the green and red body lights 21 – 24 and 31 – 33 not only apprises the adjacent motorists of the change in movement and acceleration and deceleration of the circuit-equipped vehicle; but if one or the other of body-light circuits 20 or 30 is out of order for some reason, then the remaining operative circuit will still have substantial signalling value. For example, if no body lights are illuminated while the vehicle is moving and the red lights come on when the vehicle begins slowing down, then another motorist in sight of the vehicle will know that the green circuit is inoperative. Also, if the body lights do not illuminate regardless of the movement of the vehicle, an observer may regard the body light circuit as defective.

The traffic hazards which the electrical vehicle circuit system of this invention will remedy are too numerous to list and describe completely. However, some examples of such hazards, which would be illustrative only, and by no means limiting the invention, would be as follows:

When a child darts, a drunkard jaywalks, or other careless person moves into the path of a rapidly moving vehicle incorporating the circuit 10 and the operator of the vehicle applies his brakes, an immediate, automatic combination audio-visual signal will enable the person to receive an earlier warning of his peril, and thereby take evasive action sooner than he could after hearing the horn, if blown, and the screeching brakes of a conventional automobile.

The automatic illumination of the front and side body lights on a vehicle incorporating the above system approaching an intersection immediately indicates to other motorists approaching the intersection whether the observed vehicle is decelerating or continuing to move through the intersection without stopping.

The application of brakes in a trailing vehicle embodying the invention will immediately and automatically alert the driver of a leading vehicle, such as one changing lanes, by both horn and light signals, of his dangerous maneuver. Such a warning would also be equally effective where another vehicle is approaching and turning in front of the vehicle equipped with the invention.

The circuit system 10 may also be employed by a motorist to request an oncoming driver to dim his blinding headlights at night, without in turn blinding the oncoming motorist. A momentary depression of either the horn button or the brake pedal will produce two conspicuous, but non-blinding, flashes to issue from the high-beam headlights 56 and 57.

A vehicle incorporating the brake-light circuit 125 is provided with high-intensity illuminants 127 and 128 as auxiliary rear brake lights, back-up lights, and turn signal lights. When lamps 127 and 128 are employed as back-up lights, they produce more effective illumination because of their continually alternating high and low signals to better scan the area in the rear of the vehicle and also to more effectively warn other motorists or pedestrians in the rear of the vehicle. Not only do the rear lamps 127 and 128 assist in overcoming the disadvantages of direct or reflected sunlight in the early morning or late afternoon hours, when functioning either as brake lights or turn signals, but also produce brief but conspicuous auxiliary light signals at night in order to overcome the effect of other illuminating stimuli in the area, such as advertising signs.

What is claimed is:

1. A signal system for a motor vehicle comprising:
   a. a tail-lamp circuit including a high-intensity tail lamp,
   b. a tail-lamp relay, including a coil and a relay switch,
   c. an electrical source of energy,
   d. a brake switch operatively connected to a brake pedal for closing upon depression of said brake pedal,
   e. an electrical relay coil circuit connecting said brake switch to said tail-lamp relay coil,
   f. said relay switch being electrically connected to said source and being adapted to open and close said tail-lamp circuit,
   g. said relay coil being energized by the closing of said brake switch to cause said relay switch to close said tail-lamp circuit thereby energizing said high-intensity tail lamp,
   h. a first electrical timing element in said electrical relay coil circuit adapted to limit the duration of the illumination of said tail lamp to a brief period after said relay coil has been energized,
   i. a daylight circuit in parallel with said first timing element,
   j. said daylight circuit including, in series, a daylight switch and a second electrical timing element,
   k. a main light switch in said vehicle for controlling the head lamp circuit of said vehicle,
   l. said daylight switch and said main light switch being operatively connected so that said daylight switch is closed when said main light switch is open, and vice-versa,
   m. the value of said second timing element being such that when said daylight switch is closed, the duration of illumination of said tail lamp is substantially longer than said brief period.

2. The invention according to claim 1 in which said first electrical timing element comprises a first condenser, and said second electrical timing element comprises a second condenser.

3. The invention according to claim 1 in which said tail lamp comprises means for alternately emitting high and low beams when said tail lamp is energized.

4. The invention according to claim 1 in which said vehicle includes a turn-signal circuit and turn signals, and further comprising switch means for connecting said turn signal circuit to said tail-lamp circuit, said switch means being operatively connected to said main light switch so that when said main light switch is open, said switch means is closed and said tail lamp will be energized by the actuation of one of said turn-signals.

5. The invention according to claim 1 further comprising a pilot-light circuit connected to said brake switch and including in series a pilot light and a second daylight switch, said second daylight switch being operatively connected to said first daylight switch to close said pilot-light circuit when said first daylight switch is closed and when said main light switch is open, and vice versa.

6. The invention according to claim 1 in which said vehicle includes a reverse-gear mechanism, and further comprising a reverse-gear circuit connecting said source to said relay coil, said reverse-gear circuit including switch means operatively connected to said reverse gear mechanism to normally open said reverse-gear circuit when said reverse-gear mechanism is disengaged, and for closing said reverse-gear circuit when said reverse gear mechanism is engaged in order to energize said coil and cause said tail lamp to illuminate.

* * * * *